Figure 1:
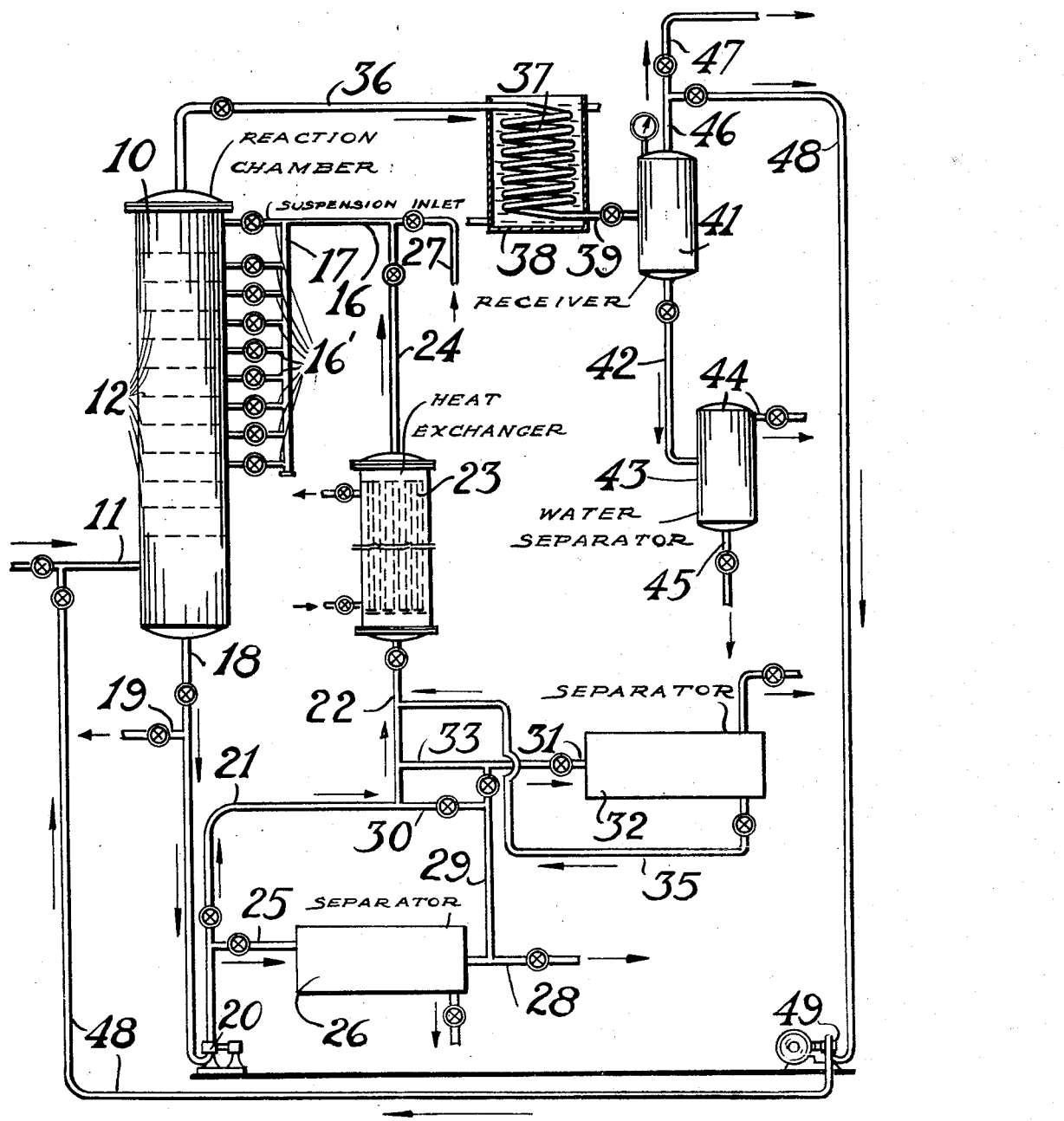

June 13, 1939. E. B. PECK 2,161,974
METHOD OF CONTROLLING EXOTHERMIC REACTIONS
Filed Jan. 21, 1937 2 Sheets—Sheet 1

Edward B. Peck Inventor
By P. L. Young Attorney

June 13, 1939. E. B. PECK 2,161,974
METHOD OF CONTROLLING EXOTHERMIC REACTIONS
Filed Jan. 21, 1937    2 Sheets-Sheet 2

Edward B. Peck Inventor
By P. L. Young Attorney

Patented June 13, 1939

2,161,974

UNITED STATES PATENT OFFICE 2,161,974

METHOD OF CONTROLLING EXOTHERMIC REACTIONS

Edward B. Peck, Elizabeth, N. J., assignor to Standard Oil Development Company, a corporation of Delaware Application January 21, 1937, Serial No. 121,427

14 Claims. (Cl. 260—449)

This invention relates to a method of controlling exothermic reactions and pertains more particularly to a method of controlling the temperature of catalytic gas reactions to maintain the reaction temperature within desired limits.

In many chemical processes involving the reaction of gases, the temperature maintained determines the nature of the end products and in order to produce the desired products the temperature must be maintained within close limits. In many such reactions the liberation of heat during the reaction makes it difficult to maintain the required temperature control. Many reactions which are theoretically possible and can be attained on a laboratory scale cannot be carried out on a commercial scale due to the amount of heat transfer surface necessary to remove the exothermic heat of reaction.

Moreover, in many commercial processes involving the reaction of gases the rate of reaction is limited by the amount of heat which can be removed from the reaction zone.

For example, liquid hydrocarbons within the motor fuel boiling range can be produced by passing carbon monoxide and hydrogen, in the ratio of one part of carbon monoxide to two parts of hydrogen by volume, over a suitable hydrogenating and polymerizing catalyst, providing the temperature is maintained between about 375° F. and 410° F. However, if the temperature is maintained materially above this range, excessive quantities of gaseous hydrocarbons, such as methane, are produced and at temperatures below this range very little, if any, reaction is brought about. This reaction, however, liberates about 70,000 B. t. u. for each 1,000 cu. ft. of gas reacted. It will be readily apparent, therefore, that an exceedingly difficult heat exchange problem is involved to remove such a large amount of heat from the reaction zone and at the same time maintain the reaction temperature within such close limits.

The hydrogenating and polymerizing catalyst employed may be any of the well known combinations, such as nickel activated with oxides of aluminum, manganese, thorium, etc.

While my invention will have a more general application, it will be of particular advantage in the synthesis of liquid hydrocarbons from a mixture of carbon monoxide and hydrogen. Liquid hydrocarbons can be synthesized from carbon monoxide and hydrogen according to the following equation:

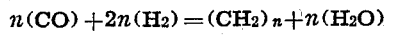
$$n(CO) + 2n(H_2) = (CH_2)_n + n(H_2O)$$

One of the principal objects of my invention is to provide an improved method for maintaining highly exothermic gas reactions within closely controlled temperature limits.

A further object of my invention is to provide an improved method of absorbing heat from the reaction zone in which gases are caused to undergo exothermic reactions which require a minimum of heat exchange equipment.

A further object of my invention is to provide an improved process for carrying out exothermic reactions, wherein some of the reaction products are separated from the unreacted gases within the reaction zone to prevent dilution of the reaction gases by the reaction products in subsequent sections of the reaction zone.

Among the more specific objects of my invention is to provide a complete unitary process for the production of liquid hydrocarbons from carbon monoxide and hydrogen in a continuous manner which involves the continuous passage of the catalyst and a heat absorbing medium through the reaction zone in contact with the reactant gases at a rate which will maintain the zone within prescribed temperature limits, the separation of reaction products from the catalyst and the heat absorbing media withdrawn from the reaction zone, the reconditioning and cooling of the catalyst and the heat absorbing media so withdrawn and then return to the reaction zone.

Various other objects and advantages will be apparent from the more detailed description hereinafter.

In accordance with my invention, the catalyst is suspended in a liquid heat absorption medium and the suspension is passed through the reaction zone in direct contact with the reaction gases passing therethrough.

The reaction zone is provided with gas liquid contact elements, constructed as hereinafter described so as to cause intimate contact between the reaction gases and the catalyst suspension while preventing the catalyst from separating from the heat absorption medium.

The liquid heat absorption medium may be substantially unvaporizable under the conditions obtaining within the reaction zone or it may be partially vaporizable so that a portion of heat liberated by the reaction is absorbed by vaporization of a portion of the fluid medium. The fluid medium should be relatively inactive but should preferably have a relatively high solubility for the reactants so that they may penetrate the fluid film on the catalyst surface and directly contact with the catalyst, more especially a preferential solubility for the reactant, the activity of which most favorably effects the yield.

In the synthesis of liquid hydrocarbons from carbon monoxide and hydrogen it is also desirable to employ a fluid medium having a relatively higher solvent power for carbon monoxide.

As another phase of my invention, I employ a cooling medium which has a relatively high solvent power for the products of the reaction as well as for the reactants so that a substantial portion of the reaction products may be withdrawn from the reaction zone with the heat adsorption medium and thereby reduce the dilution of reactants with reaction products in subsequent sections of the reaction zone.

Among the fluids which are particularly suitable as a suspension medium for the catalysts in the synthesis of liquid hydrocarbons from carbon monoxide and hydrogen are oxygenated organic compounds, such as alcohols, ethers and esters, containing over 20 carbon atoms. For example, oxygenated compounds produced by partial oxidation of paraffin wax and petrolatum, particularly oxidation products which have been hydrogenated to render them relatively stable, may be used to advantage.

While such oxygenated compounds are particularly advantageous due to their relatively high solvent power for carbon monoxide, other heat absorption liquids may be employed, such as hydrocarbon fractions ranging from gas oil to, and including heavy lubricating oils or petrolatum. Such hydrocarbon fractions may be obtained from the process or from an extraneous source. Also inorganic compounds, such as metallic salts of organic or inorganic acids, liquid under the conditions maintained within the reaction zone and aqueous salt solutions may be used.

Figure 2:
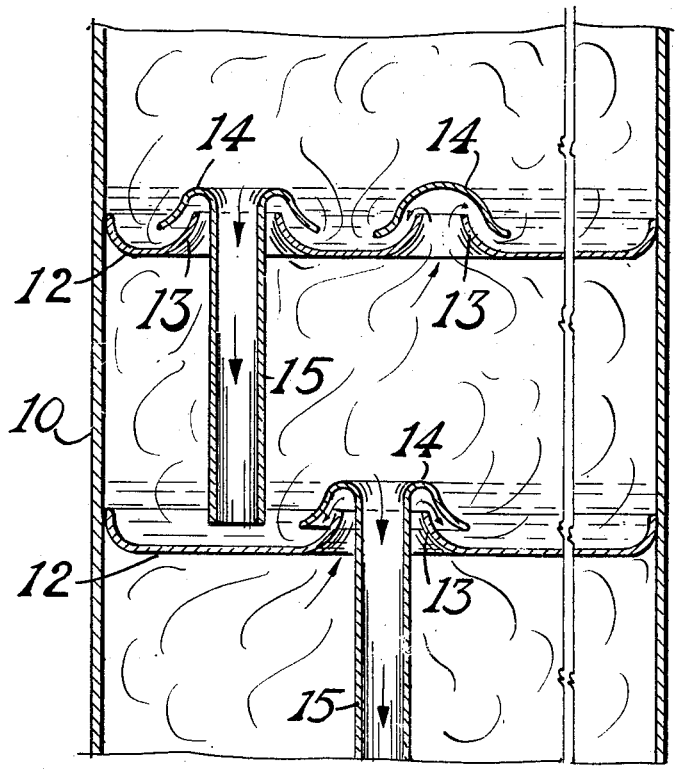

With the above nature and objects in view, my invention will be best understood from the more detailed description hereinafter in which reference will be made to the accompanying drawings in which, Figure 1 is a diagrammatic illustration of apparatus suitable for carrying the invention into effect, and Figure 2 is a fragmentary sectional view of the reaction chamber showing the construction of the bubble trays.

In the following detailed description the invention will be described with respect to the formation of liquid hydrocarbons from carbon monoxide and hydrogen, it being understood that the invention, in some of its broader phases, will have more general application.

Referring to Figure 1, the carbon monoxide and hydrogen to be reacted in the ratio of about two volumes of hydrogen to one of carbon monoxide is introduced into the reaction chamber 10 through line 11 at a temperature of about 370° F., wherein the reactant gases pass in direct countercurrent contact with the catalyst suspended in a heat absorption medium of the character hereinbefore described. The reaction chamber is provided with suitable gas liquid contact elements such as bubble trays 12, to effect intimate contact between the gases and the fluid medium. The gas liquid contact elements should be so constructed as to cause constant agitation of the suspension to prevent the catalyst from separating from the heat absorption liquid medium within the reaction zone. The construction shown in detail in Figure 2 is of particular advantage. In accordance with this construction, the vapor nozzles 13 in the bubble trays 12 are upwardly curved and the bell caps 14 are in the form of a mushroom to provide a streamlined construction so as to avoid the formation of pockets in which the suspension might collect. As shown, some of the bell caps are provided with downwardly extending tubes 15 through which the suspension overflows from one tray to the next succeeding lower tray. The end of the tubes extends below the level of liquid in the tray to provide a liquid seal. The bell caps are supported on the trays by suitable spiders (not shown). In lieu of forming the overflow tubes 15 in the bell caps as shown, separate overflow pipes for the liquid suspension may be provided.

The suspension may be introduced into the top of the reaction chamber 10 through line 16 or through any one or more points longitudinally of the reaction chamber through inlet pipes 16' connected with the manifold 17 at a temperature not exceeding about 370° F. The suspension may be preheated to the minimum desired reaction temperature of about 370° F. or before being introduced into the reaction chamber or it may be introduced at a somewhat lower temperature and heated to reaction temperature by the reaction products passing through the upper portion of the chamber. In the latter case, the upper section of the reaction chamber serves as a heat exchanger. The suspension is passed through the reaction chamber 10 at such a rate that a temperature above about 410° F. is never exceeded.

The amount of heat absorption liquid employed will depend upon whether the liquid is partially vaporizable or unvaporable under the conditions maintained in the reaction zone, the heat conductivity of the medium and other factors.

For example, when employing oil as a heat absorption medium having from 5 to 10% vaporized during its passage through the reaction zone, such as a refined turbine oil having a flash point of from 380–390° F., the circulation in the neighborhood of 100 gallons of the oil through the reaction zone for each gallon of oil produced will be required. When using a substantially non-vaporizable oil such as an oil having a flash point above 500° F. will require the circulation of 200 or more gallons.

The suspension saturated with reaction products after passing through the reaction chamber is withdrawn from the bottom through line 18 and may be withdrawn from the process through line 19 or a part or all of it may be cooled to the desired minimum temperature and recycled to the top of the reaction chamber after being subjected to revivification and recovery treatment. To this end, a part or all the suspension may be forced from line 18 by means of pump 20 through lines 21 and 22 to a heat exchanger 23, wherein the suspension is cooled to the desired minimum reaction temperature for recycling to the reaction chamber 10. The cooled suspension is then passed through lines 24 to the inlet pipes 16 and 16'. Before returning suspension withdrawn from the bottom of the reaction chamber, a part or all may be passed through line 25 to suitable separators, such as centrifuges, filter-beds, precipitators or settling tanks for removal of the catalyst and other solids. The separator unit is shown diagrammatically as rectangle 26. The catalyst so separated may be revivified and reused. Fresh catalyst to make up for that withdrawn may be introduced through line 27 which merges with line 24. A part or all of the liquid removed from the separator 26 may be withdrawn from the process through line 28 or recycled to the process either directly through lines 29 and 30 or after first passing via line 31 to a liquid fractionator such as a distilling and fractionating unit or a solvent separator for removing surplus reaction products. The liquid fractionator is shown diagrammatically as rectangle 32. A solvent separator may be used instead of a distilling and fractionating unit whenever the difference in boiling range of the heat absorption medium and absorbed liquid reaction products does not permit separation by distillation. When employing oil as the heat absorption medium which is produced in the process or from an extraneous source, the liquid fractionating equipment may be dispensed with and surplus oil removed from the reaction chamber may be withdrawn through line 19 or 28. If desired, a part or all of the total suspension may be passed to the liquid separator 32 from line 22 through lines 33 and 31 without first being treated in separator 26 to remove solids therefrom.

Surplus liquid or reaction products separated in the separator 32 are removed through line 34 and the remainder is recycled through line 35.

Returning now to the reaction chamber 10, the gaseous products after passing through the reaction chamber pass overhead through line 36 to a coil 37 located in the condenser 38 from whence they pass through line 39 to a receiver 41.

The products from the condenser coil 37, after passing into the receiver 41, separate into vapors and liquid products. The liquid products which comprise water and light liquid hydrocarbons are withdrawn from the receiver 41 through line 42 and passed to a water separator 43. The condensate is removed through line 44 and the water through line 45. The uncondensed gases separated in the receiver 41 pass overhead through line 46. If desired, these gases may be withdrawn from the system through line 47, or a part or all of the gases may be recycled through line 48 and compressor 49 to the reaction chamber for further treatment.

While I have laid particular emphasis on the method of regulating the temperature within the reaction chamber within prescribed limits, it will be understood that my invention in its entirety embraces the complete process involving the separation of the reaction products from the catalyst and cooling medium, the separation and reconditioning of any of the portion of the catalyst withdrawn from the reaction zone, the cooling and recycling of the catalyst and cooling medium and such other steps and combination of steps hereinbefore described which contribute toward a more efficient and economical operation of the process.

When applying my invention to the production of liquid hydrocarbons from carbon monoxide and hydrogen, the following example may be helpful, it being understood that the example is illustrative rather than limitative.

A gas mixture containing 24% carbon monoxide and 50% hydrogen by volume and the remainder inert, is preheated to a temperature of 380° F. and charged to a reaction chamber containing 50 bubble trays of the structure illustrated in the drawings, at a rate of 1000 cu. ft. per hr. A catalyst suspension containing about ¾ lb. of fresh finely divided nickel catalyst activated with magnesium aluminum oxide is suspended in one gallon of sulfur free oxidized paraffin wax. This suspension is charged through the reaction chamber at a rate of 300 gallons per hour.

The reaction produces about one gallon of liquid hydrocarbons for each 1000 cu. ft. of gas charged.

Having thus described the preferred embodiments, it is understood that my invention embraces such variations and modifications as come within the spirit and scope thereof.

What I desire to have protected by Letters Patent is:

1. A method of controlling the temperature of gases undergoing exothermic catalytic reactions within the desired temperature limits which comprises passing the reacting gases through a reaction zone in contact with a solid catalyst capable of effecting the desired reaction maintained in suspension within a fluid medium of sufficient quantity to absorb excess heat resulting from the exothermic reactions, thereafter withdrawing the fluid medium from the reaction zone, removing the excess heat of the reaction from the fluid medium so withdrawn and returning the same to the reaction zone.

2. A method of controlling the temperature of gases undergoing exothermic catalytic reactions within desired temperature limits which comprises passing the reacting gases through a reaction zone in contact with a solid catalyst capable of effecting the desired reaction maintained in suspension within a non-reactive fluid medium, passing the suspension through the reaction zone at a rate which will prevent the temperature thereof from exceeding a prescribed maximum, thereafter withdrawing the suspension from the reaction zone, cooling suspension so withdrawn and returning the same to the reaction zone.

3. In the process for carrying out exothermic gaseous reactions in the presence of a catalyst within a reaction zone wherein non-gaseous reaction products are formed within the reaction zone, the method which comprises passing the gases to be reacted through the reaction zone in countercurrent contact with a fluid suspension containing the catalyst; passing said suspension through the reaction zone at a rate which will maintain the temperature therein within prescribed limits, thereafter withdrawing the suspension and non-gaseous reaction products formed in said reaction zone and separating the reaction products from said suspension.

4. In the process of carrying out exothermic gas reactions wherein non-gaseous reaction products are formed in the reaction zone; the improvement which comprises passing the gases to be reacted through the reaction zone in countercurrent contact with a suspension containing the catalyst for effecting the desired reaction, passing the suspension through the reaction zone at a rate which will prevent the temperature therein from exceeding a prescribed maximum, thereafter withdrawing the suspension and non-gaseous reaction products formed in said reaction zone, separating the non-gaseous reaction products from said suspension and returning the suspension to the reaction zone.

5. A method of carrying out exothermic gas reactions which comprises passing the gases to be reacted through a reaction zone containing a catalyst suspended in a heat absorption medium, passing the suspension of heat absorption medium and catalyst through the reaction zone at a rate which will prevent the temperature therein from exceeding a prescribed maximum, thereafter withdrawing the suspension from the reaction zone, separating the catalyst from said suspension, revivifying the catalyst so separated and returning the same to the reaction zone.

6. The method of carrying out exothermic gaseous reactions wherein non-gaseous reaction products are formed in the reaction zone; the improvement which comprises passing the gases to be reacted through the reaction zone containing a catalyst capable of effecting the desired reaction suspended in a heated absorption medium, continuously passing the suspension of catalyst and heat absorption medium through the reaction zone at a rate which will prevent the temperature therein from exceeding a prescribed maximum, thereafter removing the suspension and non-gaseous reaction products from the reaction zone, separating at least a portion of the catalyst from the suspension so withdrawn, separating non-gaseous reaction products from the remainder of said suspension, thereafter bringing said suspension to the minimum desired reaction temperature and returning the same to the reaction zone.

7. A method of producing liquid hydrocarbons from carbon monoxide and hydrogen which comprises passing a mixture of carbon monoxide and hydrogen through a reaction zone in contact with a solid catalyst suspended in a fluid medium, passing said suspension of catalyst and fluid medium through the reacting zone in countercurrent contact with the reacting gases and regulating the amount of flow of cooling medium containing said suspension to maintain the temperature within the reaction zone between desired limits, thereafter withdrawing said cooling medium, removing the excess heat of the reaction and returning the same to the reaction zone.

8. A method of producing liquid hydrocarbons from carbon monoxide and hydrogen which comprises passing a mixture of said carbon monoxide and hydrogen in the ratio of about 1 part of carbon monoxide to 2 parts of hydrogen by volume through a reaction zone in contact with a catalyst suspended in a partially vaporizable liquid cooling medium, passing said suspension containing the catalyst in said cooling medium through the reaction zone in countercurrent contact with the reacting gases and regulating the amount of cooling medium within the reaction zone to maintain the same at a temperature which will effect conversion of said carbon monoxide and hydrogen into liquid hydrocarbons, thereafter withdrawing said cooling medium, removing the excess heat of reaction from cooling medium and returning the same to the reaction zone.

9. A method of producing liquid hydrocarbons from carbon monoxide and hydrogen which comprises passing a mixture of said carbon monoxide and hydrogen through a reaction zone in contact with a catalyst suspended within an oxygenated liquid hydrocarbon, passing said suspension of catalyst and oxygenated liquid hydrocarbon through the reaction zone in countercurrent contact with the reacting gases passing therethrough and regulating the amount of oxygenated liquid hydrocarbons within the reaction zone to maintain the same at a temperature which will effect conversion of carbon monoxide and hydrogen into liquid hydrocarbons, thereafter withdrawing said oxygenated liquid hydrocarbon from the reaction zone, removing the excess heat of reaction from the oxygenated liquid hydrocarbon and returning the same to the reaction zone.

10. The method of producing hydrocarbons from carbon monoxide and hydrogen which comprises passing a mixture of said gases through a reaction zone in contact with a catalyst suspended in a heat absorption medium, passing the suspension of catalyst and heat absorption medium through the reaction zone at a rate which will prevent the reaction temperature from exceeding a predetermined maximum, withdrawing the suspension of catalyst and cooling medium from the reaction zone, cooling suspension so withdrawn to the desired minimum reaction temperature and recirculating the same to the reaction zone.

11. A method of producing hydrocarbons from carbon monoxide and hydrogen which comprises passing a mixture of said gases through a reaction zone in countercurrent contact with a suspension comprising a catalyst suspended in a heat absorption medium, continuously passing said suspension through said reaction zone at a rate which will prevent the temperature of the reaction zone from exceeding a predetermined maximum, withdrawing suspension from the reaction zone, separating at least a portion of the catalyst from the suspension so withdrawn, revivifying the catalyst so separated and returning it to the reaction zone, cooling the remainder of the suspension to the minimum desired reaction temperature and thereafter passing the same to the reaction zone.

12. A method of producing hydrocarbons from carbon monoxide and hydrogen which comprises passing a mixture of said gases in a proportion suitable for producing hydrocarbons through a reaction zone at an initial temperature of about 380° F. in countercurrent contact with a suspension comprising a catalyst suspended in a heat absorption medium, passing the suspension through the reaction zone at a rate which will prevent the reaction temperature from exceeding a prescribed maximum, whereby gaseous and non-gaseous reaction products are formed, thereafter withdrawing the suspension containing non-gaseous reaction products from the reaction zone, separating the reaction products from the suspension so withdrawn, cooling at least a portion of the suspension and returning the same to the reaction zone.

13. A method of producing liquid hydrocarbons from carbon monoxide and hydrogen which comprises heating a mixture of said gases in proportions suitable for forming liquid hydrocarbons to a temperature of about 380° F., passing the gases so heated through a reaction zone in countercurrent contact with the suspension comprising a reaction catalyst suspended in a heat absorption medium, passing said suspension through the reaction zone at a rate which will prevent the temperature of the reaction from exceeding a prescribed maximum, thereafter withdrawing the suspension from the reaction zone, separating at least a portion of the catalyst from the suspension so withdrawn, cooling the remainder of the suspension, revivifying the catalyst so separated, combining the revivified catalyst with the cooled suspension and passing the combined mixture to the reaction zone.

14. In the process for the conversion of carbon monoxide and hydrogen into hydrocarbons wherein a mixture of said gases is caused to pass through a reaction zone in countercurrent contact with a suspension comprising a reaction catalyst contained in a heat absorption medium and the suspension is passed through the reaction zone at a rate which will maintain the reaction temperature below a prescribed maximum whereby non-gaseous reaction products are formed in the reaction zone; the improvement which comprises continuously withdrawing the suspension containing the non-gaseous products from the reaction zone, separating the reaction products from the suspension so withdrawn, separating at least a portion of the catalyst from the suspension, cooling the remainder of said suspension, adding fresh catalyst to said suspension to compensate for that separated, cooling the suspension to a prescribed minimum reaction temperature and returning the same to the reaction zone.

EDWARD B. PECK.